United States Patent [19]

Cornelius

[11] Patent Number: 4,683,924

[45] Date of Patent: Aug. 4, 1987

[54] TREE AND BRUSH CUTTING AND CHIPPING APPARATUS

[76] Inventor: Billie G. Cornelius, 15515 Lee Rd., Houston, Tex. 77032

[21] Appl. No.: 837,296

[22] Filed: Mar. 7, 1986

[51] Int. Cl.⁴ ............................................. A01G 23/08
[52] U.S. Cl. .................................. 144/3 D; 56/13.9; 56/504; 30/379.5; 144/34 R; 144/34 E; 241/101.7
[58] Field of Search ...................... 144/2 N, 3 D, 34 R, 144/34 E; 56/13.9, 328 R, 500, 504, 505; 30/379.5; 241/101.7

[56] References Cited

U.S. PATENT DOCUMENTS

| | | | |
|---|---|---|---|
| 3,624,697 | 11/1971 | Fuller | 56/504 |
| 3,979,075 | 9/1976 | Heron | 144/34 |
| 4,121,777 | 10/1978 | Kolstad et al. | 144/2 N |
| 4,273,169 | 6/1981 | Baenen | 144/34 R |
| 4,338,985 | 7/1982 | Smith et al. | 56/13.9 |
| 4,355,670 | 10/1982 | Ohrberg et al. | 56/13.9 |
| 4,412,660 | 11/1983 | Morin | 56/504 |

Primary Examiner—W. D. Bray
Attorney, Agent, or Firm—Neal J. Mosely

[57] ABSTRACT

Apparatus for cutting and chipping trees and brush includes a housing telescopically received at the end of a hollow rectangular boom or secured onto the existing boom of a vehicle and for contacting tree limbs or brush to be cut and chipped. The housing has a cutting member at the front portion extending outwardly for cutting trees or brush and feeds the cut material into a chipper. The rear of the housing forms a rectangular duct and a pair of alignment guides extend angularly outward from the front portion to receive the trunk of the tree being cut. A pair of cable guides extend between the top of the housing to the front of the alignment guides to divert power lines or cables and prevent them from being cut. The chipper reduces the cut material to chip size for passage through the duct. A blower moves chipped materials rearwardly through the duct portion. A nozzle on the underside of the housing discharges fluid onto the remaining cut materials to seal the cut portion. The cutting member preferably is a cylindrical member with radially-extending cutting blades secured thereon and rotate in the opposite direction of the chipping member.

22 Claims, 6 Drawing Figures

TREE AND BRUSH CUTTING AND CHIPPING APPARATUS

BACKGROUND OF THE INVENTION

1. Field of the Invention

This invention relates to a tree and brush cutting and chipping apparatus having cutting and chipping members in a single housing.

2. Brief Description of the Prior Art

Tree trimming machinery is known in the art. Most apparatus of the prior art is designed to either cut trees and brush or to chip the cut trees and brush. In most clearing operations, such as clearing right-of-ways for power lines, it is often necessary to use two or three machines or vehicles as well as a line crew and tree crew to complete the tree or brush clearing operation. The line crew will move the tree cutting machine into position and cut the necessary trees, limbs, or brush. The cuttings are then transported to a chipping machine where they are chipped or shredded by the tree crew. The cuttings are fed from the chipping machine to a dump truck and then removed from the site to be disposed of or resold as mulch, poultry litter, etc.

There are several patents which disclose various tree cutting and chipping machines.

Pallari, U.S. Pat. No. 3,996,980 discloses a clearing machine for brushwood or the like comprising a pair of shearing units mounted on a main frame secured to a mobile tractor. Each shearing unit comprises a stationary plate and a pair of laterally spaced rotary cutting blades rotatble in opposite directions toward one another in a horizontal plane which cooperate with the stationary plate to shear brushwood and feed to a chopping unit. A pushing fork bends the timber to be cut forward so that the base of the timber is fed to the chopper base first. Feed reels on the rotary blades facilitate feeding to the chopping unit. The details of the chopping unit are not disclosed. The chips produced by the chopper are removed by a blower and pipe to a loading bed which is entirely separate from the tractor.

Trout, U.S. Pat. No. 3,343,575 discloses a tree and brush rotary saw attachment for the free end of the boom of a backhoe. The saw assembly is mounted on a frame which is maneuverable for sawing at different elevations and angles for sawing brush and trees, and for tree trunks and limbs into desired lengths. A nozzle applies a tree and brush killing chemicals to the saw blade, and to the resultant stumps to destroy the stumps. The rotary saw attachment does not provide for chipping or otherwise disposing of the cut trees or brush.

Baenen, U.S. Pat. No. 4,273,169 discloses a tree harvesting cable saw for severing a standing tree adjacent its base. The apparatus comprises a main frame pivotally supported on the end of a boom that is in turn pivoted on a vehicle turn-table. The frame has a pair of tree gripping grapple arms at the upper end for gripping the tree to be cut and a cable saw at the bottom end. The cable saw is an endless cable which runs over pulleys mounted on a pair of movable arms which scissor together to completely sever the tree while being gripped by the grapple arms. The apparatus does not provide for chipping or otherwise disposing of the cut trees or brush.

Luscombe, U.S. Pat. No. 4,063,359 discloses a vehicle mounted boom device including a lower boom member pivotally mounted on the the vehicle and an upper boom pivotally connected thereto. An elongate chain saw mechanism is mounted on the upper boom for carrying out tree pruning or cutting operations. There is no provision for chipping or otherwise disposing of the cuttings.

The present invention is distinguished over the prior art in general, and these patents in particular by a tree and brush apparatus having a housing which may be telescopically recieved at the end of a hollow rectangular boom or secured onto the existing boom of a vehicle and carried into contact with the objects to be cut and chipped. The housing has a cutting member at the front which cuts the material and feeds it bottom first into a rotating cylindrical chipping member within the housing. The rear of the housing forms a rectangular duct and pair of alignment guides extend angularly outward from the front portion to receive the trunk of the tree being cut. A pair of cable guides extend between the top of the housing to the front of the alignment guides to divert power lines or cables and prevent them from being cut. The chipping member reduces the cut material to chip size and feeds the produced chips through the duct. Blower units mounted on the housing facilitate advancing chipped materials rearwardly through the duct portion of the housing. A nozzle mounted on the underside of the housing discharges fluid onto the remaining cut materials to seal the cut portion against hazards which may cause damage or the remaining portion.

SUMMARY OF THE INVENTION

It is therefore an object of the present invention to provide a tree and brush cutting and chipping apparatus having both cutting and chipping members within a single housing eliminating the need for separate mechanisms or vehicles for cutting and chipping operations.

It is another object of this invention to provide a tree and brush cutting and chipping apparatus having a housing which may be secured onto the existing boom of a vehicle or telescopically received at the end of a hollow rectangular boom.

Another object of this invention is to provide a tree and brush cutting and chipping machine which when telescopically received at the end of a hollow rectangular boom eliminates the need for separate mechanisms or vehicles for cutting, chipping, and chip transporting operations.

Another object of this invention is to provide a tree and brush cutting and chipping machine which has a nozzle mounted on the underside of the housing discharges fluid onto the remaining cut materials to seal the cut portion against hazards which may cause damage to the remaining portion.

Another object of this invention is to provide a tree and brush cutting and chipping apparatus which may be controlled by a single operator seated within the cab of a vehicle.

A further object of this invention is to provide a tree and brush cutting and chipping machine which is simple in construction, economical to manufacture, and rugged and durable in use.

Other objects of the invention will become apparent from time to time throughout the specification and claims as hereinafter related.

The above noted objects and other objects of the invention are accomplished by apparatus for cutting and chipping trees and brush having a housing which may be telescopically received at the end of a hollow rectangular boom or secured onto the existing boom of a vehicle and carried into contact with the objects to be cut and chipped. The housing has a cutting member which cuts the material and feeds the cut material bottom first into a rotating cylindrical chipping member within the housing. The rear of the housing forms a rectangular duct and a pair of alignment guides extend angularly outward from the front portion to receive the trunk of the tree being cut. A pair of cable guides extend between the top of the housing to the front of the alignment guides to divert power lines or cables and prevent them from being cut. The chipping member reduces the cut material to chip size and feeds the produced chips through the duct and blower units mounted on the housing facilitate advancing chipped materials rearwardly through the duct portion of the housing. A nozzle mounted on the underside of the housing discharges fluid onto the remaining cut materials to seal the cut portion against hazards which may cause damage or to arrest growth or effect destruction of unwanted foliage.

DESCRIPTION OF THE PREFERRED EMBODIMENT

Figure 1:
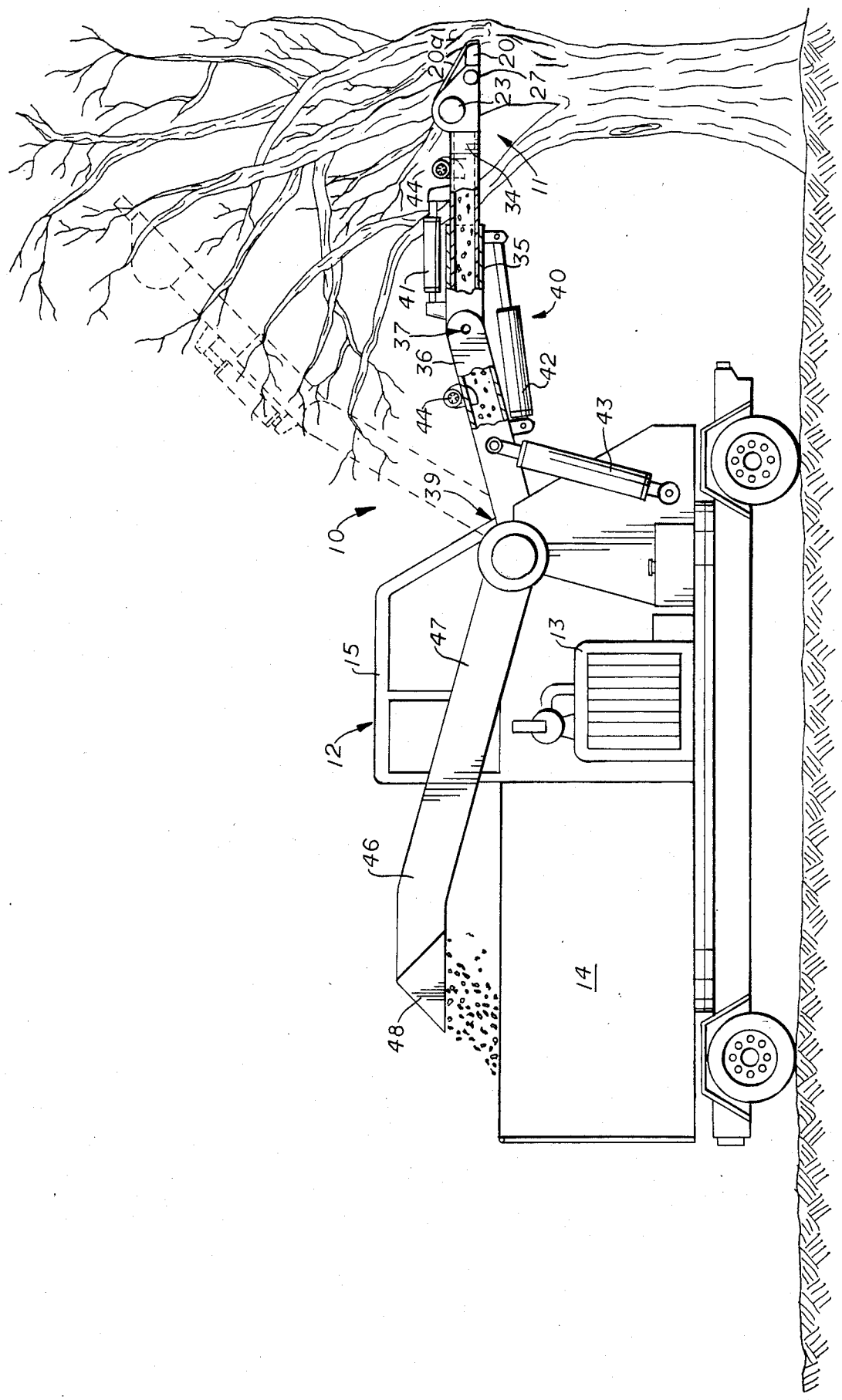
FIG. 1 is a side elevation view of a preferred apparatus for cutting and chipping trees and brush telescopically received at the end of a hollow rectangular boom of a vehicle and carried into contact with the objects to be cut and chipped.

Referring to the drawings by numerals of reference, there is shown in FIG. 1, a preferred tree and brush cutting and chipping apparatus 10. A cutting and chipping assembly 11 is mounted on the boom of a tractor type vehicle 12 having a gasoline engine powered compressor unit 13 for supplying hydraulic pressure, and large chip box 14 mounted on the vehicle frame for containing the chipped material. The vehicle 12 is driven or towed to the job site. A cab 15 is provided wherein the operator may sit in comfort and safety while operating the various controls.

Figure 2:
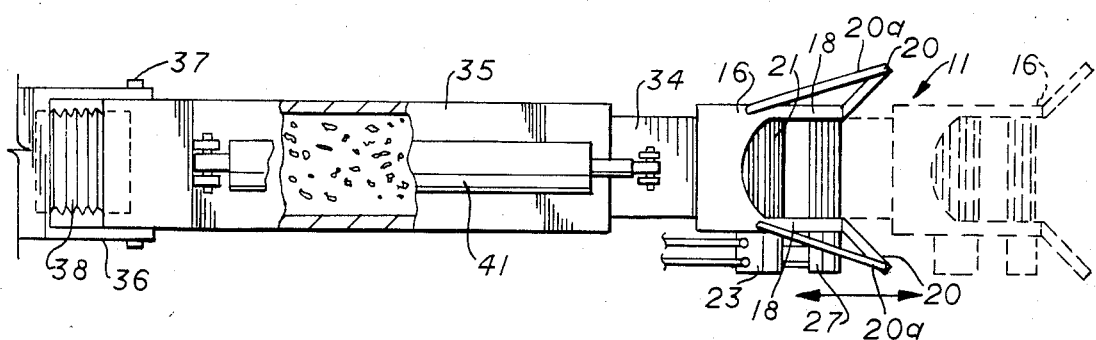
FIG. 2 is a top plan view of the housing and boom portion of the apparatus of FIG. 1.
Figure 3:
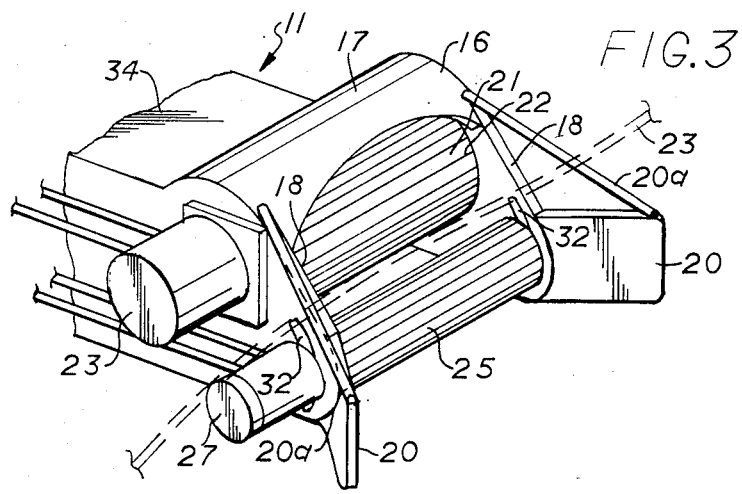
FIG. 3 is an isometric view of the housing of the preferred apparatus.
Figure 4:
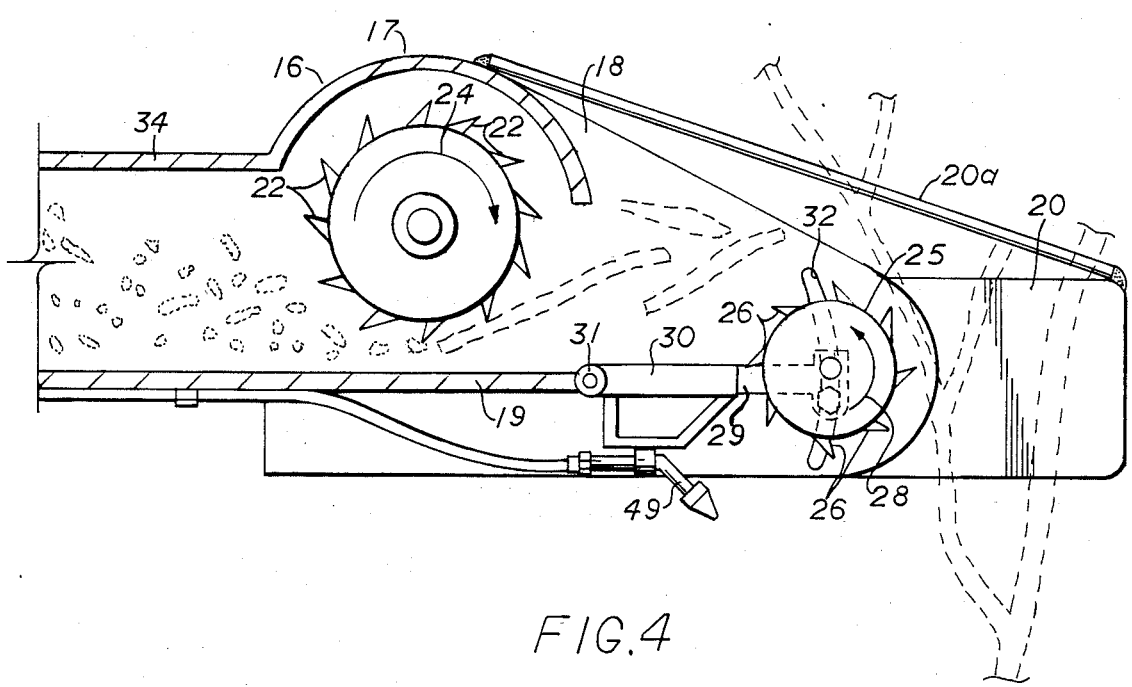
FIG. 4 is a longitudinal cross section taken along line 41'4 of FIG. 3 showing the cutting member, chipping member, and nozzle member.

Referring additionally to FIGS. 2, 3, and 4, the cutting and chipping assembly 11 comprises a housing 16 made of heavy duty steel plate having a curved top wall 17, a pair of straight side walls 18, and a flat bottom plate 19. The side walls 18 extend angularly outward from the front of the top wall 17 and bottom plate 19 to form a pair of diverging alignment guides 20 to receive the trunk of the tree being cut. A pair of tubular cable guides 20a extend between the top of the housing to the front of the alignment guides to divert power lines or cables and prevent them from being cut. A chipper or rotary cylindrical chipping head 21 having a series of longitudinal radially extending, circumferentially spaced chipping blades 22 is rotatably secured between the side walls 18. The chipping head 21 is driven by a hydraulic motor 23 to rotate about the horizontal axis in a clockwise direction as viewed in the position shown in FIG. 3 as indicated by the arrow 24. The chipping head 21 is generally centered between the curved top wall 17 and the bottom wall 19.

A smaller cutting head 25 having a series of longitudinal radially extending, circumferentially spaced cutting blades 26 is rotatably secured transversely between the front portion of the side walls 18. The cutting head 25 is driven by a hydraulic motor 27 to rotate about the horizontal axis in a counter-clockwise direction when viewed in the position shown in FIG. 3 as indicated by the arrow 28. The cutting head 25 is located forward of the chipping head 21 and its longitudinal axis is below that of the chipping head. The axle of the cutting head 25 is secured between ears 29 of a support member 30. The support member 30 is pivoted at its rearward end of the front of the bottom plate 19 as indicated at 31. The ears 29 are releasably and adjustably mounted within arcuate cut-outs 32 in the side walls 18 for adjustment of cutting head 25 relative to the chipping head 21.

The diverging alignment guides 20 extend outwardly beyond the circumference of the cutting head 25 to receive the trunk of the tree being cut and the cable guides 20a extend between the top of the housing to the front of the alignment guides to divert power lines or other generally horizontally disposed obstacles 33 from being carried into the path of the cutting head 25 as illustrated in dotted line in FIG. 3.

The housing 16 has a rearwardly extending portion forming a hollow rectangular enclosure or duct 34 for receiving the chipped material from the chipping head 21. The rear of the duct 34 is slidably and telescopically received within a second hollow rectangular enclosure or duct 35. The rear end of the second enclosure or duct 35 is pivotally connected to a third rectangular enclosure 36 as indicated at 37. A conventional flexible or bellows type connection 38 connects the interior of the second and third ducts 35 and 36. The third duct 36 is pivotally mounted to the vehicle 12 as indicated at 39. The mounting may also rotatably attached to the vehicle frame. The ducts 34, 35, and 36 are preferably made of steel plate and serve as a hollow boom 40 for supporting the housing 16.

The duct portion 34 of the housing 16 is moved telescopically relative to the second duct 35 by a hydraulic cylinder 41 having one end mounted at the top of each member. Pivotal movement between the second and third ducts 35 and 36 is by a second hydraulic cylinder 42 having one end mounted at the bottom of each member. Pivotal movement between the third duct 36 and the vehicle 12 is by a pair of hydraulic cylinders 43 having one end mounted on the vehicle 12 and the other at each side of the third duct 36. Hydraulic pressure to the cylinders is supplied by the compressor 13 and controlled by the vehicle operator in the cab 15.

Hydraulic blower units 44 and 45 may be mounted on the ducts 34 and 35 in communication with the interior portions thereof to facilitate movement of the chipped materials rearwardly through the ducts.

An elongated hollow rectangular exhaust chute 46 mounted on the vehicle 12 receives the chipped material from the third duct 36. One end 47 of the chute 46 is pivotally mounted on the vehicle as indicated at 39 and the other end extends outwardly therefrom and terminates in a laterally extending hood portion 48. The hood portion deflects the chipped material into the chip box 14. A conventional flexible or bellows type connection such as 38 (previously shown in FIG. 2 is provided between the interior of the third duct 36 and the chute 46.

As best shown in FIGS. 3 and 4, a fluid discharge nozzle 49 is mounted on the underside of the support member 30 and connected to a pressurized fluid source on the vehicle 12 which is controlled by the operator within the cab 15. The nozzle 49 is positioned to discharge fluid outwardly beyond the cutting head 25. Suitable fluids conventional in the tree trimming industry may be dispensed at the time of cutting. For example, tar sealant solutions may be sprayed onto the remaining stumps or branches to seal the remaining cut portion against insects and other hazards which may cause damage.

While one embodiment of a vehicle has been described and illustrated, the cutting and chipping assembly 11 may be easily mounted on vehicles having conventional non-hollow booms. For this application, the forwardmost portion of the cutting and chipping assembly including the housing 16 and duct portion 34 is used. The housing 16 is bolted or otherwise attached to the boom of the vehicle. The rear duct portion 34 of the housing 16 is connected to one end of a flexible hollow duct to form an exhaust chute. The other end of the chute is placed to direct the chipped materials into a remote chip box or recepticle. A round duct or chute having a rectangular adapter to fit the rear duct portion 34 may also be used.

Figure 5:
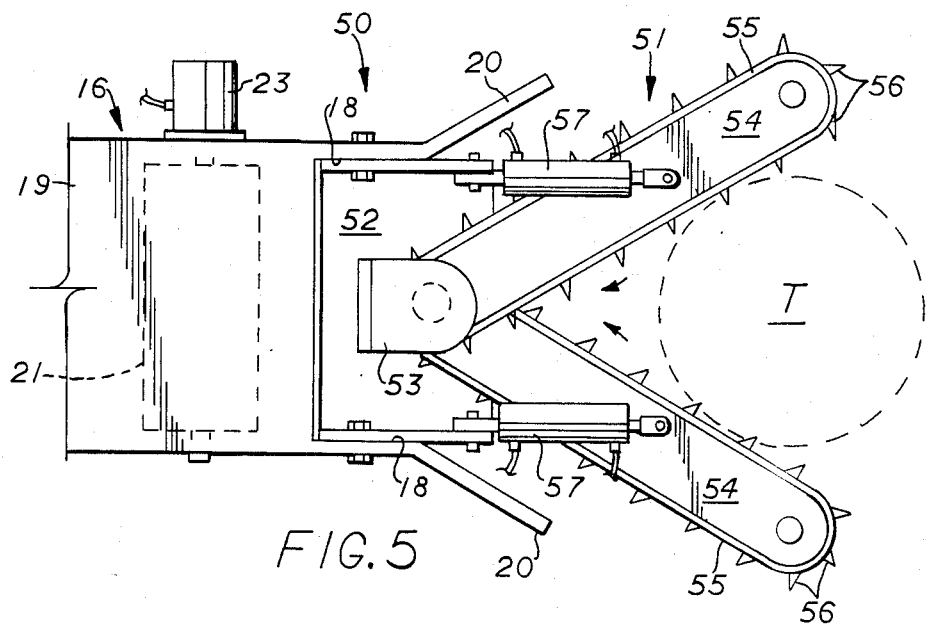
FIG. 5 is a bottom plan view of the housing of an alternate embodiment of the apparatus having a chain saw cutting member.

FIG. 5 illustrates a modification of the cutting and chipping assembly 50 where a chain saw cutting member 51 is located forward of the chipping head 21 and below its longitudinal axis, rather than a rotary cutting head. Parts previously described are given the same numerals of reference. The chain cutting member 51 comprises a sub frame 52 secured between the side walls 18 at the front of the bottom plate 19 of the housing 16. A hydraulic motor 53 is mounted thereon for driving the chain saw assembly 51. The chain saw assembly 51 comprises a pair of flat guide bars 54 pivotally mounted at one end about the axis of the output shaft of the hydraulic motor 53. The other ends of the guide bars 54 extend outwardly beyond the front of the housing 16 and pivot in a scissors motion about the output shaft axis. A chain 55 having a series of spaced cutting elements 56 is carried on the periphery of the guide bars 54.

Pivotal movement of the guide bars 54 is accomplished by a pair of hydraulic cylinders 57 having one end mounted on the sub frame 52 and the other end on the guide bar 54. In use, the guide bars 54 are spread to accomodate the trunk T of the tree being cut and the cutting and chipping assembly 50 is moved toward the trunk. As the cut is made, the guide bars 54 may be scissored together, and/or the assembly 50 advanced to sever the tree. After severing, the bottom portion of the cut portion is carried into the chipping head 21 by the inward direction of rotation of the saw chain 55 as indicated by arrows.

Figure 6:
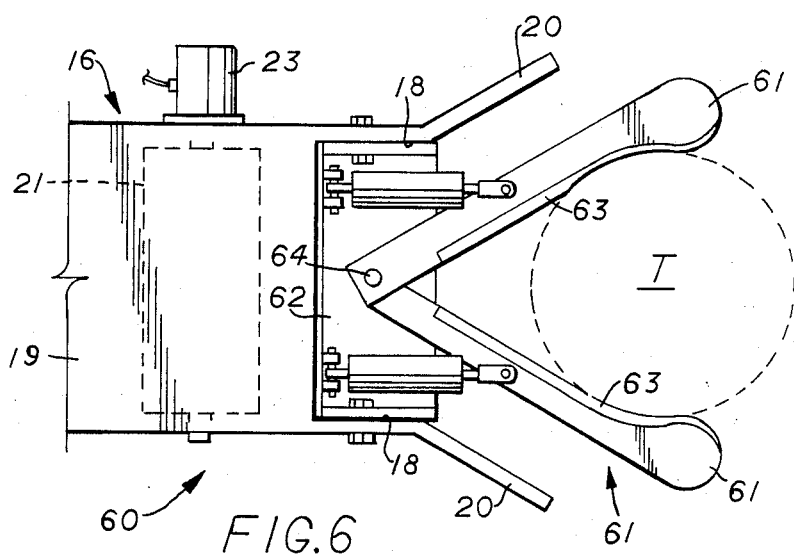
FIG. 6 is a bottom plan view of the housing of an alternate embodiment of the apparatus having a pair of cutting blades.

FIG. 6 illustrates another modification of the cutting and chipping assembly 60 having a pair of elongated scissor-like shearing blades 61 located forward of the chipping head 21 and below its longitudinal axis. Parts previously described are given the same numerals of reference. The shearing blades 61 are mounted on a sub frame 62 secured between the side walls 18 in front of the bottom plate 19 of the housing 16. The shearing blades 61 are flat rectangular members having a sharp cutting edge 62 on their innermost edges. The shearing blades 61 are pivotally mounted at one end about the axis of a pivot pin 64. The other ends of the shearing blades 61 extend outwardly beyond the front of the housing 16 and pivot in a scissor-like fashion about the pivot pin 64. The outer ends of the blades 61 may be curved in a manner to facilitate inward movement of the cut material toward the housing.

Pivotal movement of the shearing blades 61 is by a pair of hydraulic cylinders 65 having one end mounted on the sub frame 62 and the other end on the blade 61. In use, the shearing blades are spread to accomodate the trunk T of the tree and the cutting and chipping assembly 60 is moved toward the trunk. As the cut is made, the blades are scissored together, and/or the assembly 60 advanced to completely sever the tree. After severing, the bottom portion of the cut portion is carried into the chipping head 21.

OPERATION

To use the cutting and chipping assembly 11 on vehicles having conventional non-hollow booms, the forwardmost portion of the cutting and chipping assembly including the housing 16 and duct portion 34 is bolted or otherwise conventionally attached to the boom of the vehicle. The rear portion of the duct 34 is connected to one end of a conventional flexible hollow duct to form an exhaust chute. The other end of the chute is may be placed to direct the chipped materials into a remote chip box or any other suitable receptacle. A round duct or chute having a rectangular adapter to fit the rear portion of the duct 34 may also be used. The cutting head 25 is secured relative to the chipping head 21 to accomodate the diameter of the cutting.

The cutting and chipping assembly 11 is placed adjacent the tree or brush to be cut with the trunk being received between the alignment guides 20. In clearing right-of-ways for power lines, the apparatus of the present invention is particularly useful, because of the cut is usually made closely below potentially dangerous high power cables and telephone lines. The cable guide arms 20a allow the power lines or cables to ride over the housing, rather than being fed into the path of the cutting and chipping blades. The operator activates the cutting and chipping heads and the blower units. The assembly is advanced by the operator moving the boom into the trunk of the tree. The cutting head 25 cuts into the trunk and the operator continues the forward movement. As the tree is severed, the cutting is carried into the housing bottom first by the action of the cutting head 25 to be fed into the chipping head 21.

The blades 22 of the chipping head 21 chip the cut materials into small chips which are directed rearward into duct portion 34 by the chipping head. The blower 44 mounted on the top of the first duct portion facilitates movement of the chipped material rearward. On conventional boom vehicles the chips are forced by the blower through the previously installed conventional duct or exhaust chute system to exit at the rear thereof which is placed in a position to direct the chipped materials into a remote chip box or any other suitable recepticle.

On vehicles having a hollow boom structure as hereinbefore described, the chipped materials are blown through the second and third hollow rectangular enclsoures or ducts 35 and 36 then into the chute 46 facilitated by the hydraulic blower units 44. The chipped materials are deflected into the chip box 14 by the hood 48. With motor powered vehicles, the chipped materials are then driven from the job site to be disposed of or resold as mulch, poultry litter, etc.

The apparatus according to the present invention elminates the need for separate machinery, and the number of people in the various work crews to carry out the tree clearing and transporting operations.

While this invention has been described fully and completely with special emphasis upon a preferred embodiment, it should be understood that within the scope of the appended claims the invention may be practiced otherwise than as specifically described herein.

I claim:

1. Apparatus for cutting and chipping trees and brush comprising:
   a hollow tubular housing having side walls and an open front and rear and adapted to be secured onto the boom of a vehicle for contacting trees or brush to be cut and chipped,
   a cutting member movably secured at the front of said housing and extending outwardly therefrom,
   said cutting member being movable to cut the trees and brush and the like and then feed the cut material into said housing,
   a rotary chipping member secured within said housing transversely between said side walls and spaced from said cutting member to receive the cut material,
   said chipping member being rotatable to reduce the cut material to chip size and feed the chips through the open rear end of said housing,
   means controllable from the vehicle for extending, retracting, and steering said boom to move said housing into contact with trees or brush to be cut,
   means controllable from said vehicle for moving said cutting member, and
   means controllable from said vehicle for rotating said chipping member.

2. Apparatus according to claim 1 in which
   said housing has side walls extending angularly outward from the open front to form a pair of diverging alignment guides for receiving the trunk of the object being cut and cable guides extending between the top of said housing to the front of the alignment guides for directing power lines or cables and the like over said housing to divert them from the path of said cutting and chipping members and prevent them from being cut.

3. Apparatus according to claim 1 in which
   said rotary chipping member comprises a cylindrical member having a series of circumferentially spaced chipping blades secured longitudinally to the circumference to extend radially outward therefrom, and
   said means for rotating said chipping member comprises a hydraulic motor.

4. Apparatus according to claim 1 in which
   said cutting member comprises a rotatable cylindrical member having a series of circumferentially spaced cutting blades secured longitudinally thereof and extending radially outward,
   said cutting member being rotatably and pivotally secured within the front portion of said housing and rotatable about its horizontal axis in the reverse direction from said chipping member to feed the cut material into the chipping blades of said chipping member, and
   said means for moving said cutting member comprising a hydraulic motor for rotating said cutting member.

5. Apparatus according to claim 1 including
   means controllable from said vehicle for advancing chipped materials produced by said chipping member rearwardly through the duct portion of said housing.

6. Apparatus according to claim 5 in which
   said means for advancing chipped materials produced by said chipping member comprises a blower on the duct portion of said housing in communication with the interior thereof to facilitate movement of the chipped materials.

7. Apparatus according to claim 1 including
   a fluid discharge nozzle mounted on the underside of said housing connected to a source of pressurized fluid to discharge fluid onto the remaining cut materials to seal the cut portion against hazards which may cause damage to the remaining portion and to arrest growth or effect destruction of unwanted foliage, and
   means controllable from said vehicle for controlling the operation of said nozzle.

8. Apparatus according to claim 1 including
   an elongate flexible hollow duct releasably connected at one end to the duct portion at the back of said housing and the other end extending outwardly therefrom to form an exhaust chute for receiving the produced chips from the open back of said housing and directing the chips to a suitable recepticle.

9. Apparatus according to claim 1 in which
   said cutting member comprises a toothed chain saw member having guide arms pivotally secured at one end beneath the front end of said housing and the other ends extending outwardly to pivot in scissors motion,
   a chain carried on the periphery of each guide arm and having a plurality of spaced cutting elements secured thereon,
   chain drive means controllable from the vehicle for driving said chain,
   said chain driven about the periphery of said guide arms whereby the facing chain surfaces move in a direction toward the open front end of said housing to advance the cut material thereinto, and
   said cutting member moving means comprising pivot means for moving said guide arms in a scissors motion.

10. Apparatus according to claim 9 in which
    said pivot means comprises a pair of hydraulic cylinders.

11. Apparatus according to claim 1 in which
    said cutting member comprises a pair of elongated shearing blades pivotally secured at one end beneath the front end of said housing and the other ends extending outwardly therefrom to pivot in a scissors motion, each blade having cutting surface on the inward facing edge, and
    said cutting member moving means comprises pivot means for moving said shearing blades in a scissors motion.

12. Apparatus according to claim 11 in which
    said pivot means comprises a pair of hydraulic cylinders.

13. Apparatus according to claim 1 in which
said vehicle boom comprises an extensible and dirigible, hollow carrier boom assembly mounted at one end on said vehicle frame and the other end adapted to receive the duct portion of said housing, said hollow boom assembly receiving the produced chips from the open back end of said housing and directing the chips to a suitable recepticle.

14. Apparatus according to claim 13 including
an elongated hollow exhaust chute movably connected at one end to said boom assembly mounted on said vehicle frame and extending outwardly to form an exhaust chute for receiving the produced chips from said boom assembly and and directing the chips to a suitable recepticle.

15. Apparatus according to claim 13 in which
said means for extending, retracting, and steering the boom of said vehicle comprise at least one hydraulic cylinder.

16. Apparatus according to claim 13 including
means controllable from said vehicle for advancing chipped materials produced by said chipping member rearwardly through the interior of said boom assembly.

17. Apparatus according to claim 16 in which
said means for advancing chipped materials produced by said chipping member comprises a blower motor mounted on the boom assembly in communication with the interior thereof to facilitate movement of the chipped materials.

18. Apparatus according to claim 13 in which
said boom assembly comprises:
a hollow rectangular enclosure adapted at the front end to slidably receive the rearwardly extending duct portion of said housing and the rear end of said enclosure pivotally connected to a second rectangular enclosure with a flexible connector provided between the interiors of said enclosures,
the rear end of said second enclosure pivotally mounted to said vehicle,
means controllable from the vehicle to move the rear portion of said housing and said first stated enclosure telescopically,
means controllable from the vehicle to move said first stated enclosure and said second enclosure pivotally,
means controllable from the vehicle to pivot said second enclosure on said vehicle.

19. Apparatus according to claim 18 in which
said telescopic moving means comprises at least one hydraulic cylinder.

20. Apparatus according to claim 18 in which
said pivoting means for said first state enclosure and said second enclosure comprises at least one hydraulic cylinder.

21. Apparatus according to claim 18 in which
said pivoting means for said second enclosure and said vehicle comprises at least one hydraulic cylinder.

22. Apparatus according to claim 1 in which
said vehicle comprises;
a wheeled vehicle frame having means for generating hydraulic power and chip receptacle mounted thereon,
an extensible and dirigible, hollow carrier boom assembly mounted at one end on said vehicle frame and the other end adapted to receive and carry said housing into contact with objects to be cut, said hollow boom assembly receiving the produced chips from the open back end of said housing and directing the chips into an exhaust chute,
a hollow chute member connected to said hollow carrier boom assembly for receiving and directing chipped materials into the chip containing means, and
a cab enclosure mounted on the frame of said vehicle and including a seat and a control panel having control means wherein the operator of said apparatus may sit and operate said means controllable from said vehicle.

* * * * *